United States Patent
Houle

(10) Patent No.: US 11,972,198 B2
(45) Date of Patent: *Apr. 30, 2024

(54) CLIENT-SIDE WEB SITE SELECTION ACCORDING TO DEVICE CAPABILITIES

(71) Applicant: Disney Enterprises, Inc., Burbank, CA (US)

(72) Inventor: Brendan P. Houle, New York, NY (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/477,445

(22) Filed: Apr. 3, 2017

(65) Prior Publication Data

US 2017/0206189 A1 Jul. 20, 2017

Related U.S. Application Data

(63) Continuation of application No. 13/631,345, filed on Sep. 28, 2012, now Pat. No. 9,613,160.

(51) Int. Cl.
*G06F 40/143* (2020.01)
*G06F 3/0482* (2013.01)
(Continued)

(52) U.S. Cl.
CPC ........ *G06F 40/143* (2020.01); *G06F 16/9577* (2019.01); *G06F 40/134* (2020.01);
(Continued)

(58) Field of Classification Search
CPC ............. G06F 17/2288; G06F 17/2247; G06F 17/2235; G06F 3/0482
See application file for complete search history.

(56) References Cited

U.S. PATENT DOCUMENTS 6,412,008 B1* 6/2002 Fields ................. H04L 67/2823
709/205
2005/0071758 A1* 3/2005 Ehrich .................... G06F 9/451
715/234
(Continued)

OTHER PUBLICATIONS

Knight, Kayla. "Responsive web design: What it is and how to use it." Smashing Magazine (Jan. 12, 2011).*
(Continued)

*Primary Examiner* — Caroline H Jahnige
(74) *Attorney, Agent, or Firm* — Fay Kaplun & Marcin, LLP

(57) ABSTRACT

An aspect provides a method, including: sending a request for a web site from a client device to a server; receiving a response to the web site request from the server, wherein the response to the web site request includes at least a portion of a first version of the web site requested and one or more links describing one or more alternate versions of the web site requested, the one or more links comprising conditional data; the conditional data comprising one or more device characteristics indicating whether the web site requested and one or more of the alternate versions of the web site requested is a version of the web site appropriate for the client device, wherein the one or more device characteristics comprise device capabilities; determining if the conditional data is met; and in response to the conditional data being met, requesting an alternate version of the web site requested. Other aspects are described and claimed.

16 Claims, 4 Drawing Sheets

(51) Int. Cl.
*G06F 9/46* (2006.01)
*G06F 15/16* (2006.01)
*G06F 16/9535* (2019.01)
*G06F 16/957* (2019.01)
*G06F 40/134* (2020.01)
*G06F 40/197* (2020.01)
*H04L 67/02* (2022.01)

(52) U.S. Cl.
CPC .......... *G06F 40/197* (2020.01); *G06F 3/0482* (2013.01); *G06F 9/46* (2013.01); *G06F 15/16* (2013.01); *G06F 16/9535* (2019.01); *H04L 67/02* (2013.01)

(56) References Cited

U.S. PATENT DOCUMENTS

| | | | |
|---|---|---|---|
| 2008/0313659 A1* | 12/2008 | Eide | G06F 17/2247 719/328 |
| 2009/0150787 A1* | 6/2009 | Maehira | G06F 17/30899 715/733 |
| 2010/0218107 A1* | 8/2010 | Ehrich | H04L 67/02 715/738 |
| 2013/0290515 A1* | 10/2013 | Pemrick | G06F 16/9577 709/224 |

OTHER PUBLICATIONS

"HTML Header", https://web.archive.org/web/20101228054653/http://www.comptechdoc.org/independent/web/html/guide/htmlhead.html, Dec. 28, 2010.*

"Links in HTML documents", https://web.archive.org/web/20110902055010/https://www.w3.org/TR/html4/struct/links.html#h-12.1.1, Sep. 2, 2011.*

Keith, Jeremy, "Conditional Loading for Responsive Designs", http://24ways.org/2011/conditional-loading-for-responsive-designs, Dec. 2011. (Year: 2011).*

* cited by examiner

```
<link rel="alternate" type="text/html" media="(min-device-width:768px) and (min-device-height:768px)" title="Desktop Version"
href="http://games.espn.go.com/frontpage/ffl">

<script type="text/javascript">
(function(){
    if (!document.querySelectorAll || !window.matchMedia) return false;
    var links = document.querySelectorAll('link[rel="alternate"][type="text/html"][media]');
    for (var l=links.length-1; l>=0; --l) {
        if (window.matchMedia(links[l].getAttribute('media')).matches) {
            window.location = links[l].getAttribute('href');
        }
    }
});
</script>
```

FIG. 2

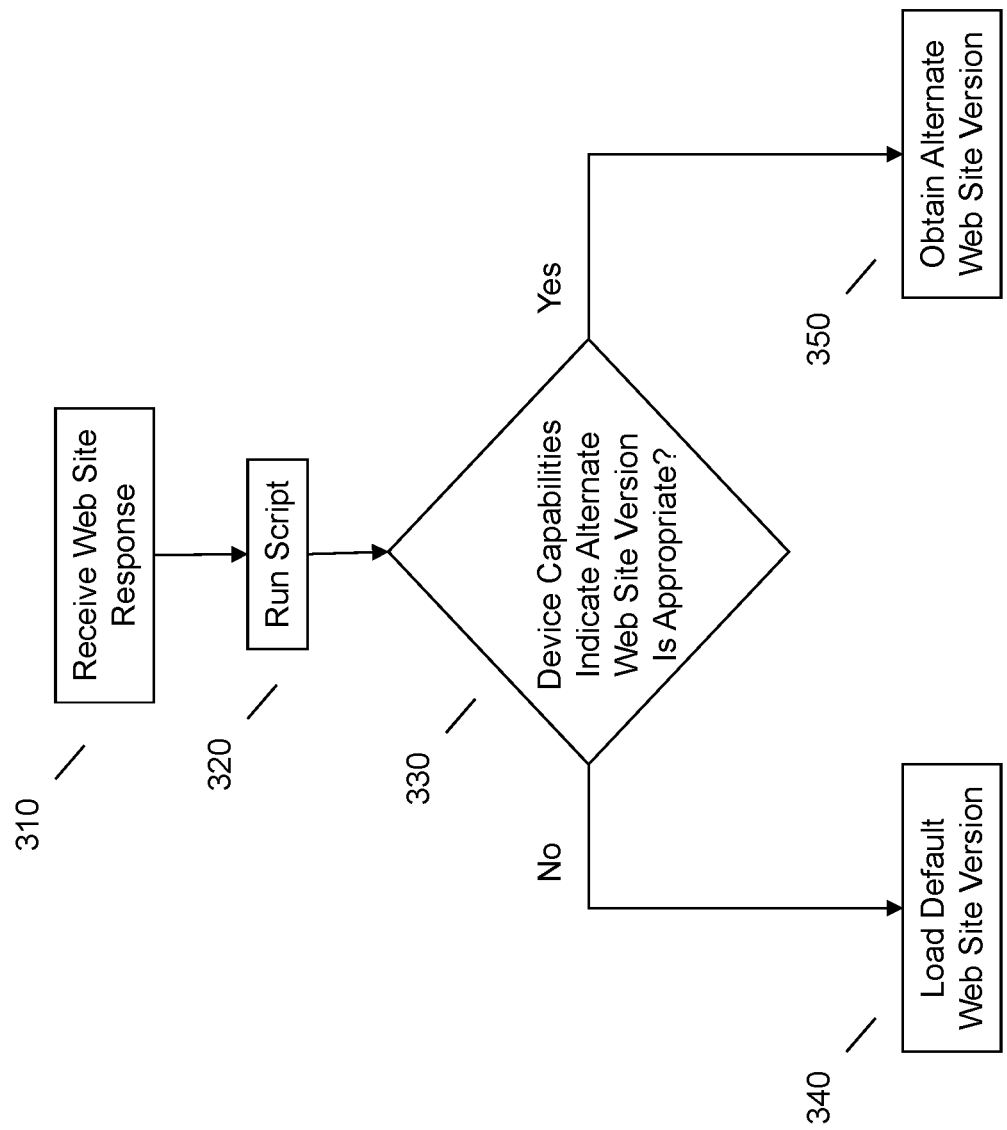

CLIENT-SIDE WEB SITE SELECTION ACCORDING TO DEVICE CAPABILITIES

CROSS REFERENCE TO RELATED APPLICATIONS

This is a continuation application that claims priority to U.S. application Ser. No. 13/631,345, filed on Sep. 28, 2012, and titled "Client-Side Web Site Selection According To Device Capabilities", the contents of which are incorporated by reference herein.

BACKGROUND

Multiple versions of web sites are commonly available. The different versions of the web sites are generally geared toward accommodating different client device and browser capabilities. A common example is providing both a standard desktop/PC version of a web site and a mobile version of the web site, with the latter usually being a scaled down or reformatted version of the web site optimized for smaller devices and different versions of web browsers.

Conventionally an automatic mobile browser detection mechanism is employed on the server-side. An example is using a server-side script that detects browser types of the requesting client device and redirects the request, if appropriate, to an alternate version (e.g. mobile version) of the web site requested. Existing solutions thus focus on a server-side approach where detection is made as to browser/device capabilities and an appropriate version of the web site is sent to the client device in response to its web site request.

In a response to all web site requests, HTTP headers are sent from the server to the requesting client device. The HTTP headers essentially describe the connection and are followed by the content of the response, including HTML content. The HTML content includes sections, one of which is the HEAD section, which includes various non-displayed data. The HEAD section is in turn followed by the body section, which includes displayable data. A server may conventionally utilize HTTP headers to provide redirects to another web site based on the server's determination that a redirect should be included, after the server has determined the type of device making the web site request. Additionally, JavaScript may be included in the HEAD section to enable functionality.

BRIEF DESCRIPTION OF THE SEVERAL VIEWS OF THE DRAWINGS

FIG. 2 illustrates an example script and link for obtaining an alternate version of a web site.

FIG. 3 illustrates a client device-side operation for obtaining an alternate version of a web site using an instruction.

DETAILED DESCRIPTION

Figure 1:
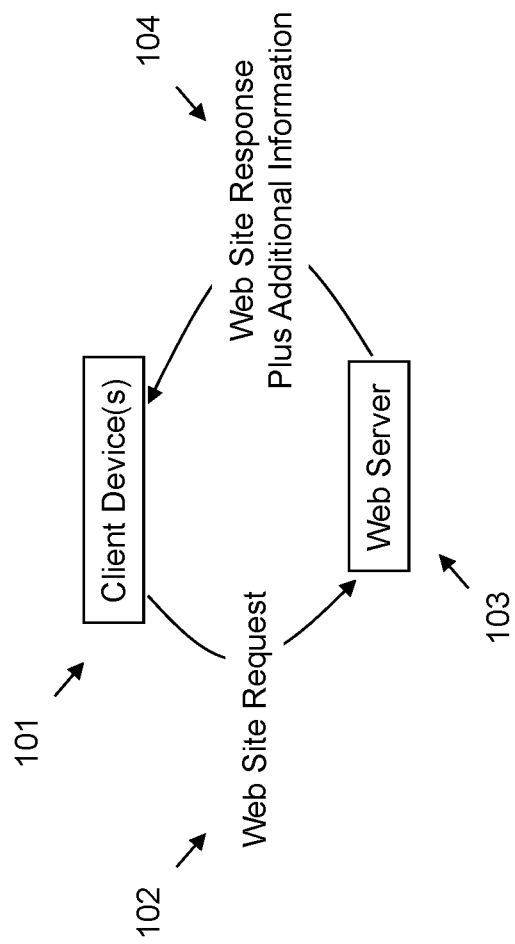
FIG. 1 illustrates an example client device-server operating environment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of claimed embodiments. One skilled in the relevant art will recognize, however, that the various described embodiments can be practiced without one or more of the specific details, or with other methods, components, materials, et cetera. In other instances, well known structures, materials, or operations are not shown or described in detail. The following description is intended only by way of example, and simply illustrates certain example embodiments. Although the method steps are described in conjunction with the systems of the figures, persons skilled in the art will understand that any system configured to perform the method steps, in any order, falls within the scope of the present invention.

Conventional arrangements focus on a server-side implemented solution to serving appropriate responses to client device web site requests. A conventional solution is for a server to attempt to ascertain device type and serve an appropriate response to the web site request. The response to the web site request may include a redirect link in a HTTP header. For example, a server may determine that a web site request originated from a mobile client device, and choose to server a response to the web site request for a desktop site having a redirect URL in a HTTP header to a mobile version of the web site. Upon receipt of the HTTP header having the redirect URL, the client device will process the HTTP header and be redirected via the URL to the mobile version of the web site.

In contrast, an embodiment implements a response that permits the client device to assess its own capabilities in selecting an appropriate version of the web site. An embodiment provides a response to a client device's web site request that contains additional information. The additional information may include one or more links to alternate versions of web sites, a script to be processed by a client device application, such as a web browser, or both. The one or more links are links directing the client device's web browser to an alternate version of the web site and providing a description of the alternate version(s) for the client device. The description of the alternate version(s) for the client device may thus include conditional data that indicates device characteristics that, if present, indicate an alternate version of the web site is appropriate for that specific device. The one or more links may be located in the HEAD section of the response to the web site request, although the one or more links may be included elsewhere in the web site response.

The script may include information to be processed by an application of the client device, such as a web browser, to ascertain one or more client device features or characteristics for obtaining an alternate version of a web site, such as included in the one or more links, if appropriate given the device characteristics. The script may be located in a HEAD section of the response to the web site response (defined herein as a header script), although the script may be included elsewhere in the web site response.

Accordingly, an embodiment provides the client device with the ability to select a version of the web site based on the specific device's capabilities or characteristics. In an embodiment, this additional information is provided in-line in the HEAD section of the web site response to the client device's web site request.

In an embodiment, the information may be included as a header script referencing one or more links to alternate versions of the website that when loaded by the client device's web browser provide an alternate version of the web site, given that specific device's capabilities. In an embodiment, there can be multiple alternate versions of a web site, over and above simply "mobile" and "non-mobile" versions. In the example of a script, the script redirects the browser to the first link included therein (according to the order in which the links are included on the page) whose media attribute(s) match(es) the device characteristics. The alternate pages mayor may not employ a responsive design. A web page employing responsive design is designed to modify attributes to a particular context, for example reformatting based on a change in screen orientation, such as occurs in switching between landscape and portrait screen orientations.

An example embodiment employs the min-device-width and min-device-height media features as device capability indicators. Other features may be used as well, for example the pointer and hover features currently included in the CSS Media Queries Level 4 draft may be used for identifying touch devices. Other features may be used as well, as apparent from the following examples.

The description now turns to the figures. The illustrated example embodiments will be best understood by reference to the figures. The following description is intended only by way of example, and simply illustrates certain example embodiments.

FIG. 1 illustrates an example client device-server operating environment in which a client device 101 sends a web site request 102 via a network to a server 103. The network connection may be made through a wired or wireless connection, such an Internet connection between the client device 101 and the server 103. The client device 101, for its part, may be a conventional desktop computing device, a mobile device such as a laptop, tablet or slate computing device or a smart phone, or any device that is used to load and view web site content, such as a navigation device, kiosk, e-reader or the like. The server 103 is a network device that responds to web page requests with web content ("web site response" as used herein) 104 that may include web page content that is displayed by client device 101 run software ("web browser" as used herein) on the client device's 101 display screen, noting that the client device 101 may have an integral display screen, a connected (wired or wirelessly) display screen, or both. The web site response 104 includes additional information, as further described herein.

In an embodiment, the web site request 102 sent by the client device 101 mayor may not include client device 101 information, such as information that may be used to identify the client device 101. Such information may include client device 101 make, model, device characteristics or capabilities, or information pertaining to software run by the client device 101. In an embodiment, the server 103 mayor may not use such client device 101 information, as further described herein.

In one embodiment, the server 103 disregards any client device 101 information sent by the client device 101 in the web site request 102. An embodiment may disregard such client device information because the server 103 need not utilize this information in formulating a web site response 104 to the client device 101. This is because in one embodiment, the server 103 does not attempt to identify the client device 101 prior to formulating the web site response 104. The web site response 104 sent to the client device 101 in this context will contain additional information which the client device 101 may use to obtain the appropriate version of the web site for loading, i.e. a client-side focus on web site version selection.

In another embodiment, the server 103 may not disregard information relating to the client device 101 in formulating the web site response 104 to the client device 101. In such an embodiment, the server 103 may utilize the information relating to the client device 101 to ascertain which additional information is most appropriate to include in the web site response 104 to the client device 104. For example, the server 103 may use this client device information in determining whether to include certain links, whether to include a script, whether to include additional information with the script (such as for running the script using an older/lower powered version of a web browser) and the like. Nonetheless, in such an embodiment, it is not required for the server 103 to know the information relating to the client device 101 in order to formulate the web site response 104, and in any event the server 103 will not attempt to determine which version of the web site the client device 101 will ultimately load, as this decision is left to the client device 101.

Referring to FIG. 2, an example of a web site response 104 is illustrated. FIG. 2 illustrates a link and a script included in the web site response 104 from the server 103. The script provides instructions to the client device 101 such that the client device 101 may load a version of the web site most appropriate for the client device 101 based on the client device's 101 capabilities. The most appropriate version of the web site for a specific client device's 101 capabilities may be ascertained in a variety of ways. In the illustrated and non-limiting example of FIG. 2, the script provides feature attributes "min-device-width" and "min-device-height" as attributes the client device 101 may leverage in order to ascertain the appropriate version of the web site to obtain.

The script and link illustrated in FIG. 2 may be included in line in a HEAD portion of a web site response 104 to the client device 101. The first portion of the web site response 104 illustrated in the example of FIG. 2 includes an example link that describes the alternate version of the web site that may be obtained by the client device 101, as well as one or more links for redirecting the client thereto, of the following format:

<link rel="alternate" type="text/html" media="(min-device-width:768px) and (min-device-height:768px)" title="Desktop Version" href="http://games.espn.go.comlfrontpage/ffl">

The link elements illustrated in FIG. 2 are non-limiting examples and may be changed. The script, which may remained unchanged (work with different link elements), references the link elements. The link element: 'media="(min-devicewidth:768px) and (min-device-height:768px)"' is conditional data indicating that, in this example, the device attributes should satisfy both minimum height and width requirements in order to obtain the alternate version of the web site. Note that this link element could be written to require one or the other (height or width), reference other device capabilities/features, or the like. The portion of the link that states "href=http://games.espn.go.comlfrontpage/fff" provides the redirect link for the alternate version of the web site that the client may obtain if the client device characteristics indicate that the device has a minimum height and width for obtaining this version of the web site.

The second portion of the web site response 104 illustrated in the example of FIG. 2 includes an example script that allows a client device 101 (e.g. a browser thereof) to find the links and evaluate the media attributes included in the links to determine if an alternate version of the web site should be obtained based on the specific client device's 101 characteristics. The example script is of the following format:

```
<script type= "text/javascript">
(function( ) {
    if (!document.querySelectorAll || !window.matchMedia) return
        false;
    var links =document.querySelectorAll('link[rel="alternate"]
    [type="text/html"][media][href]');
    for (var 1=links. length-1; 1>=0; --1) {
        if (window.matchMedia(links[l].getAttribute('media')).matches) {
            window. location = links[l].getAttribute('href');
        }
    }
})( );
</script>
```

The portion of the script "(function( ){ . . . }" indicates that the information included in the script may be run without affecting global variables outside of the web page. The portion of the script "if (!document.querySelectorAll-||!window.matchMedia) return false;" allows for a check to see if the client device's web browser is capable (has the built in capability) to find the links and use a feature ("media match" in this example) to determine client device 101 characteristics. If the web browser does not have such capabilities (returns false), the default web site may be loaded.

If the browser does have the capability to continue processing the script, it may use media match, as per the processing the portion of the script "var links=document.querySelectorAll('link[rel="alternate"][type="text/html"] [media][href]'); for (var 1=links.length-1; 1>=0; . . . 1)", which enables the browser to find the links (e.g. by iteration), whether they are located in the HEAD portion of the document or elsewhere.

The browser next processes the portion of the script "if (window.matchMedia(links[1].getAttribute ('media')).matches) {window.location=links[l].getAttribute ('href')" to determine if the media attributes indicate that the client device 101 has characteristics suitable for obtaining the alternate version of the web site, which is described in (and a redirect link provided) the one or more links. Thus, if the device capabilities return a true response, the device redirects to the link provided in the "href" attribute of the matching link, in this example ""http://games.espn.go. com/ frontpage/fff"".

Accordingly, responsive to the web browser of the client device 101 encountering the script (for example, as provided by the header script of FIG. 2), the browser of the client device will determine if the "min-device-width" and "min-device-height" of the specific client device 101 are sufficient to obtain an alternate version of the web site. In the example script, the instruction includes a redirect link to the alternate version, which the client device may obtain instead of the default version.

It should be noted that the "default" and "alternate" versions may be defined as desired. Accordingly, a default version may be a desktop version of the web site, a mobile version of the web site, a responsive version of the web site, etc. Likewise, the alternate version of the web site may be a desktop version of the web site, a mobile version of the web site, a responsive version of the web site, etc. Moreover, the alternate version of the web site may not be a re-direct linked alternate version, but may be a reformatted or otherwise modified version of the web site. Thus, the alternate version of the web site may not be a separate web site to be obtained and loaded on the client device 101 but rather may be an altered or reformatted version of the web site tailored to appropriately display on the specific client device 101.

Similarly, it should be noted that the "min-device-width" and "min-device-height" features included in the example of FIG. 2 may be modified as desired. In other words, other or additional features may be utilized. The features included in the additional information need only be probative of the client device 101 capabilities as they relate to obtaining an appropriate version of the web site for the particular client device 101.

Thus, the feature or features included in the additional information for ascertaining device specific capabilities and thus an appropriate version of the web site may be varied, as described herein. Using the "min-device-width" and "min deviceheight" features of the example script in FIG. 2 as an example, referring to FIG. 3, responsive to receiving a web site response 310, the client device's 101 web browser encounters the script (which may or may not be included in the HEAD portion of the document, as described herein) and runs the script 320.

In the script, a determination is called for with respect to the specific client device 101, in the example of FIG. 2, the display characteristics of width and height are utilized. If the client device 101 capabilities indicate that, based the features called for in the script, the default web site is appropriate 330 given the client device's 101 display characteristics, the client device 101 may load or continue loading the default web site 340. On the other hand, if the client device 101 capabilities indicate, based on the features called for in the script, the conditional data is met and an alternate version of the web site is appropriate 330 given the client device's 101 display characteristics. An alternate version of the web site thus may be obtained 350 (e.g., by sending a request to the URL contained in the script).

As a non-limiting example, the client device 101 web browser runs the script illustrated in FIG. 2 at 320, included in the web site response 104 from the server 103, and determines whether the client device's width and height meet the minimum (768px) for obtaining the alternate version of the web site. If so, the script indicates that an alternate version of the web site should be loaded at 330. If not, the client device's 101 capabilities (features) do not match the alternate version of the web site of the web site response 104, and thus the browser may utilize the default version.

In addition to the web site response including a script, an embodiment may employ alternate mechanisms for handling the web site response 104. For example, a browser may be developed having an additional feature designed to process such web site responses 104 such that inclusion of a script is not necessary, as the script's functionality would be incorporated into the web browser. Thus, the response to the request for a web site need only contain the links, which the browser will utilize in a similar fashion as a standard browser handling a response to a web site request including the script plus links. This would alter the nature of the web browser and would simplify the additional information of the web site response 104 (e.g. to providing link(s) only), but nonetheless the web site response would include information (description of device capabilities matching the alternate web site version(s) of the links) that is capable of allowing the client device 101 to determine and obtain an appropriate version of the web site for loading, whether through custom software on the client device 101 such as a web browser or via a script provided in the web site response 104 to be run on a standard web browser, or otherwise.

In addition to providing a script to be run by a browser of the client device 101, as described herein, an embodiment may provide additional data in the web site response such that a browser not capable of processing the script may nonetheless obtain alternate versions of web sites. For example, the script may be augmented to provide an older version of a web browser of a client device 101 with the ability to process the script, and thus ascertain client device 101 characteristics or features and obtain an alternate version of the web site, as desired. Such an augmented response would be more complex than simply providing an in-line script plus links, for example by including a script or program that executes on the client device to ascertain device characteristics or features and link(s), but would allow older or lower end/lightweight browsers to make use of a script and link(s) for matching client device characteristics or features with an appropriate version of a web site.

Accordingly, embodiments provide additional information, referred to herein as an instruction, which may be utilized on the client side in assisting a client device to obtain an appropriate version of the web site, matched to the client device's capabilities. Providing a web site response with information permitting the client device to select the appropriate version of the web site based on client device characteristics (features or capabilities) removes the need to determine, at the server, which type of client is making the request. Moreover, the server does not have to store client device related information since the client device does not have to be identified in order to select an appropriate response. Furthermore, this removes the need to rely on client devices sending appropriate information in the web site requests such that the server may determine which type of client (e.g. mobile, desktop, etc.) sent the request, as the server may provide the same response (default web site plus additional information enabling clients to redirect, at the client device's discretion) to all clients.

Figure 4:
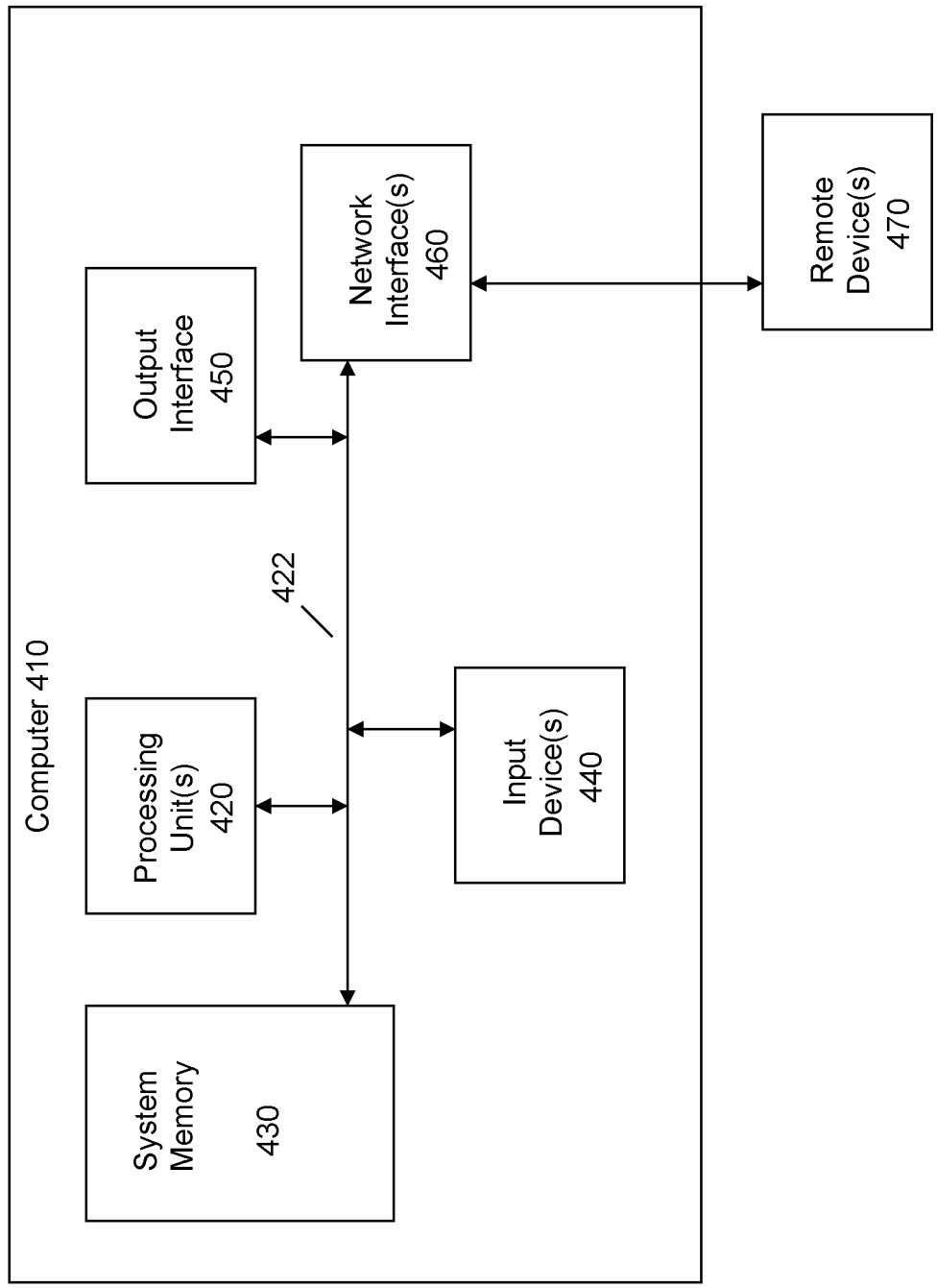
FIG. 4 illustrates an example computer.

Referring to FIG. 4, it will be readily understood that embodiments may be implemented using any of a wide variety of devices or combinations of devices, for example for formulating web site responses, obtaining appropriate versions of web sites for loading at client devices, or other functionality as described herein. An example device that may be used in implementing embodiments includes a server device in the form of a computer 410. In this regard, the computer 410 may execute program instructions configured to provide web site responses, such as at a server handling client web site requests, or program instructions configured to obtain an appropriate version of a web site, such as at a client device, as well as instructions for performing other functionality of the embodiments, as described herein. Accordingly, computer 410 may represent a client device sending a web site request to a server or may represent a server that forms the response to the client device's web site request.

Components of computer 410 may include, but are not limited to, at least one processing unit 420, a system memory 430, and a system bus 322 that couples various system components including the system memory 430 to the processing unit(s) 420. The computer 410 may include or have access to a variety of computer readable media. The system memory 430 may include computer readable storage media in the form of volatile and/or nonvolatile memory such as read only memory (ROM) and/or random access memory (RAM). By way of example, and not limitation, system memory 430 may also include an operating system, application programs, other program modules, and program data.

In the example of a client device, a user may interface with (for example, enter commands and information) the computer 410 through input devices 440. A monitor or other type of device can also be connected to the system bus 422 via an interface, such as an output interface 450. In addition to a monitor, computers may also include other peripheral output devices. The computer 410 may operate in a networked or distributed environment using logical connections (network interface 460) to other remote computers or databases (remote device(s) 470), such as for communication between client devices and servers hosting web content. The logical connections may include a network, such local area network (LAN) or a wide area network (WAN), but may also include other networks/buses.

As will be appreciated by one skilled in the art, aspects may be embodied as a system, method or computer program product. Accordingly, aspects may take the form of an entirely hardware embodiment, or an embodiment including software (including firmware, resident software, microcode, etc.) that may all generally be referred to herein as a "circuit," "module" or "system." Furthermore, aspects of the present invention may take the form of a computer program product embodied in at least one computer readable medium(s) having computer readable program code embodied thereon.

Any combination of at least one computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-signal medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of programming languages, including an object oriented programming language such as Java, Smalltalk, C++ or the like and conventional procedural programming languages, such as the "C" programming language or similar programming languages. The program code may execute on the computer 410. The computer 410 may connect to other devices through any type of network, including a local area network (LAN) or a wide area network (WAN), or the connection may be made to an external computer (for example, through the Internet using an Internet Service Provider).

Embodiments are described with reference to figures of methods, apparatus (systems) and computer program products according to embodiments. It will be understood that portions of the figures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A method, comprising:
   receiving a request for a web site from a client device;
   forming a response to the web site request, wherein the response to the web site request includes:
      a first set of information corresponding to a default version of the web site, wherein at least a portion of the first set of information enables a web browser of the client device to load the default version of the web site;
      a second set of information corresponding to a mobile version of the web site, the second set of information includes one or more media attributes associated with the mobile version of the web site; and
      a script comprising information that enables the web browser to determine the web browser is capable of finding links for the default version and the mobile version and, when the web browser is capable of finding the links, determine whether device characteristics of the client device match the one or more media attributes associated with the mobile version of the web site, wherein at least a portion of the second set of information enables the web browser to load the mobile version of the web site, wherein the default version of the website is different than the mobile version of the website; and
   sending the response to the web site request to the client device.

2. The method of claim 1, wherein the script is included in a HEAD portion of an HTML document of the response to the web site request.

3. The method of claim 1, wherein the response to the web site request includes program code configured to be executed by the web browser.

4. The method of claim 3, wherein the program code comprises a utility configured to process the script.

5. The method of claim 1, wherein to determine the device characteristics of the client device includes determining whether a minimum height and width required for the mobile version is met.

6. A computer program product, comprising:
   a non-transitory computer readable storage medium having computer readable program code embodied therewith, the computer readable program code comprising:
   computer readable program code configured to receive a request for a web site from a client device;
   computer readable program code configured to form a response to the web site request, wherein the response to the web site request includes:
      a first set of information corresponding to a default version of the web site, wherein at least a portion of the first set of information enables a web browser to load the default version of the web site;
      a second set of information corresponding to a mobile version of the web site, the second set of information includes one or more media attributes associated with the mobile version of the web site; and
      a script comprising information that enables the web browser to determine the web browser is capable of finding links for the default version and the mobile version and, when the web browser is capable of finding the links, to determine whether device characteristics of the client device match the one or more media attributes associated with the mobile version of the web site, wherein at least a portion of the second set of information enables the web browser to load the mobile version of the web site, wherein the default version of the website is different than the mobile version of the website; and
   computer readable program code configured to send the response to the client device.

7. The computer program product of claim 6, wherein the script is included in a HEAD portion of an HTML document of the response to the web site request.

8. The computer program product of claim 6, wherein to determine the device characteristics of the client device includes determining whether a minimum height and width required for the mobile version is met.

9. A method, comprising:
   at a client device:
      sending a request for a web site to a server;
      receiving a response to the web site request from the server, wherein the response to the web site request includes:

a first set of information corresponding to a default version of the web site, wherein at least a portion of the first set of information enables a web browser running on the client device to load the default version of the web site;

a second set of information corresponding to a mobile version of the web site, the second set of information includes one or more media attributes associated with the mobile version of the web site; and a script comprising information that enables the web browser running on the client device to determine the web browser is capable of finding links for the default version and the mobile version and, when the web browser is capable of finding the links, determine whether device characteristics of the client device match the one or more media attributes associated with the mobile version of the web site, wherein at least a portion of the second set of information enables the web browser running on the client device to load the mobile version of the web site, wherein the default version of the website is different than the mobile version of the website; and loading the mobile version of the web site.

10. The method of claim 9, wherein the script is included in a HEAD portion of an HTML document of the response to the web site request.

11. The method of claim 9, wherein to determine the device characteristics of the client device includes determining whether a minimum height and width required for the mobile version is met.

12. A computer program product, comprising:

a non-transitory computer readable storage medium having computer readable program code embodied therewith, the computer readable program code comprising:

computer readable program code configured to send a request for a web site to a server;

computer readable program code configured to receive a response to the web site request from the server, wherein the response to the web site request includes:

a first set of information corresponding to a default version of the web site, wherein at least a portion of the first set of information enables a web browser to load the default version of the web site;

a second set of information corresponding to a mobile version of the web site, the second set of information includes one or more media attributes associated with the mobile version of the web site; and a script comprising information that enables the web browser to determine the web browser is capable of finding links for the default version and the mobile version and, when the web browser is capable of finding the links, determine whether device characteristics of a client device match the one or more media attributes associated with the mobile version of the web site, wherein at least a portion of the second set of information enables the web browser to load the mobile version of the web site, wherein the default version of the website is different than the mobile version of the website.

13. The computer program product of claim 12, wherein the script is included in a HEAD portion of an HTML, document of the response to the web site request.

14. The computer program product of claim 12, wherein to determine the device characteristics of the client device includes determining whether a minimum height and width required for the mobile version is met.

15. An apparatus, comprising:

one or more processors; and a computer readable storage medium having computer readable program code embodied therewith and executable by the one or more processors, the computer readable program code comprising:

computer readable program code configured to send a request for a web site to a server;

computer readable program code configured to receive a response to the request for the web site from the server, wherein the response to the request for the web site includes:

a first set of information corresponding to a default version of the web site, wherein at least a portion of the first set of information enables a web browser to load the default version of the web site;

a second set of information corresponding to a mobile version of the web site, the second set of information includes one or more media attributes associated with the mobile version of the web site; and a script comprising information that enables the web browser to determine the web browser is capable of finding links for the default version and the mobile version and, when the web browser is capable of finding the links, determine whether device characteristics of a client device match the one or more media attributes associated with the mobile version of the web site, wherein at least a portion of the second set of information enables the web browser to load the mobile version of the web site, wherein the default version of the website is different than the mobile version of the website.

16. The apparatus of claim 15, wherein to determine the device characteristics of the client device includes determining whether a minimum height and width required for the mobile version is met.

* * * * *